United States Patent
Paul

(10) Patent No.: US 10,087,980 B2
(45) Date of Patent: Oct. 2, 2018

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. H.c.F. Porsche Aktiengesellschaft, Stuttgart (DE)

( * ) Notice: Subject to any disclaimer, the term of this patent is extended or adjusted under 35 U.S.C. 154(b) by 57 days.

(21) Appl. No.: 15/040,141

(22) Filed: Feb. 10, 2016

(65) Prior Publication Data
US 2016/0258477 A1    Sep. 8, 2016

(30) Foreign Application Priority Data

Mar. 5, 2015    (DE) .................. 10 2015 103 203

(51) Int. Cl.
| F02B 75/04 | (2006.01) |
| F16C 7/06 | (2006.01) |
| F16C 23/10 | (2006.01) |
| F16C 9/04 | (2006.01) |

(52) U.S. Cl.
CPC .............. *F16C 7/06* (2013.01); *F02B 75/045* (2013.01); *F16C 23/10* (2013.01); *F16C 9/04* (2013.01); *F16C 2360/22* (2013.01)

(58) Field of Classification Search
USPC ................... 123/197.3, 48 B, 78 E
See application file for complete search history.

(56) References Cited

U.S. PATENT DOCUMENTS

| 9,080,604 B2 | 7/2015 | Rossmanith |
| 9,695,745 B2 * | 7/2017 | Paul ................ F02B 75/045 |
| 2014/0177989 A1 | 6/2014 | Rossmanith |
| 2015/0260094 A1 | 9/2015 | Wittek |

(Continued)

FOREIGN PATENT DOCUMENTS

| DE | 521676 C | 3/1931 |
| DE | 2223721 A1 | 6/1973 |

(Continued)

OTHER PUBLICATIONS

British Searh Report dated Jul. 22, 2016.
International Search Report dated Oct. 6, 2015.
German Office Action dated Jan. 4, 2017.

*Primary Examiner* — Marguerite McMahon
(74) *Attorney, Agent, or Firm* — Gerald E. Hespos; Michael J. Porco; Matthew T. Hespos

(57) ABSTRACT

A connecting rod (10) has a big end bearing eye (11) for attachment to a crankshaft and a small end bearing eye (12) for attachment to a piston of a cylinder. An eccentric adjusting device (13) adjusts an effective connecting rod length. The eccentric adjusting device (13) has eccentric rods (15, 16) that engage on an eccentric lever (14) of the eccentric adjusting device (13) so that, in the region of each eccentric rod (15, 16), a connecting pin (36) extends through apertures in the eccentric lever (14) and in the respective eccentric rod (15, 16). The aperture (37) in the respective eccentric rod (15, 16), through which the respective connecting pin (36) extends, and/or a section of the respective connecting pin (36) that extends through the aperture (37) in the respective eccentric rod (15, 16), has/have arched contours, at least in some section or sections.

6 Claims, 3 Drawing Sheets

(56) References Cited

U.S. PATENT DOCUMENTS

2016/0208687 A1    7/2016   Okuma et al.
2016/0258478 A1*   9/2016   Paul ..................... F02B 75/045

FOREIGN PATENT DOCUMENTS

| DE | 102005055199 A1 | 5/2007 |
| --- | --- | --- |
| DE | 10 2010 016 037 | 9/2011 |
| DE | 102011077278 B3 | 10/2012 |
| EP | 3040535 A1 | 7/2016 |
| GB | 985066 A | 3/1965 |
| GB | 1380947 A | 1/1975 |
| JP | 5852313 U | 4/1983 |
| JP | 61195748 U | 12/1986 |
| JP | 10159844 A | 6/1998 |
| WO | 2014/019683 | 2/2014 |

\* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2015 103 203.1 filed on Mar. 5, 2015, the entire disclosure of which is incorporated herein by reference.

BACKGROUND

1. Field of the Invention

The invention relates to a connecting rod for an internal combustion engine and to an internal combustion engine.

2. Description of the Related Art

DE 10 2010 016 037 A1 and FIG. 1 herein disclose an internal combustion engine having an adjustable compression ratio. Thus, the connecting rod 10 has a big end bearing eye 11 and a small end bearing eye 12. The big end bearing eye 11 is used to attach the connecting rod 10 to a crankshaft (not shown in FIG. 1) and the small end bearing eye 12 is used to attach the connecting rod 10 to a cylinder piston (not shown in FIG. 1) of the internal combustion engine. The connecting rod 10 is assigned an eccentric adjusting device 13 with an eccentric (not shown in FIG. 1), an eccentric lever 14 and eccentric rods 15, 16. The eccentric lever 14 has a bore arranged eccentrically with respect to a center 17 of the small end bearing eye 12 and has a center 18, The bore in the eccentric lever 14 accommodates the eccentric and a bore in the eccentric accommodates a piston pin. The eccentric adjusting device 13 is used to adjust an effective connecting rod length $l_{eff}$. The connecting rod length should be taken to mean the distance of the center 18 of the bore in the eccentric lever 14 from a center 19 of the big end bearing eye 11. The eccentric rods 15, 16 can be moved to turn the eccentric body 14 and hence change the effective connecting rod length $l_{eff}$. Each eccentric rod 15, 16 is assigned a piston 20, 21 that is guided movably in a hydraulic chamber 22, 23. A hydraulic prevails in the hydraulic chambers 22, 23 and acts on the pistons 20, 21 assigned to the eccentric rods 15, 16 so that movement of the eccentric rods 15, 16 is possible or not possible, depending on the oil quantity in the hydraulic chambers.

The adjustment of the eccentric adjusting device 13 is initiated by the action of inertia forces and load forces of the internal combustion engine that act on the eccentric adjusting device 13 during an operating cycle of the internal combustion engine. During an operating cycle, the directions of action of the forces acting on the eccentric adjusting device 13 change continuously. The adjusting movement is assisted by the pistons 20, 21 acted upon by hydraulic oil, and the pistons 20, 21 act on the eccentric rods 15, 16. The pistons 20, 21 prevent return of the eccentric adjusting device 13 due to varying directions of action of force of the forces acting on the eccentric adjusting device 13. The eccentric rods 15, 16 that interact with the pistons 20, 21 are attached to the eccentric body 14 on both sides. The hydraulic chambers 22 and 23 in which the pistons 20, 21 are guided can be supplied with hydraulic oil from the big end bearing eye 11 via hydraulic oil lines 24 and 25. Check valves 26 and 27 prevent the hydraulic oil from flowing back out of the hydraulic chambers 23 and 24 into the hydraulic lines 24 and 25. A changeover valve 29 is accommodated in a bore 28 in the connecting rod 10. The switching position of the changeover valve 29 determines which of the hydraulic chambers 22 and 23 is filled with hydraulic oil and which of the hydraulic chambers 22 and 23 is emptied. The adjusting direction or turning direction of the eccentric adjusting device 13 depends thereon. In this case, the hydraulic chambers 22 and 23 are in contact via fluid lines 30 and 31, respectively, and with the bore 28 that accommodates the changeover valve 29. An actuating means 32, a spring device 33 and a control piston 34 of the changeover valve 29 are shown schematically in FIG. 1, and the operation of these components of the changeover valve 29 is already known from DE 10 2010 016 037 A1.

As explained above, the hydraulic oil that acts on the pistons 20, 21 guided in the hydraulic chambers 22, 23 is fed to the hydraulic chambers 22, 23 via hydraulic lines 24 and 25, starting from the big end bearing eye 11. The connecting rod 10 engages on the crankshaft (not shown in FIG. 1) by means of the big end bearing eye 11 in such a way that a connecting rod bearing shell 35 is arranged between the crankshaft, namely a crankshaft bearing journal thereof, and the big end bearing eye.

A connecting pin 36 extends through apertures in the eccentric lever 14 and through an aperture in the respective eccentric rod 15, 16 in the region of each of the eccentric rods 15, 16 shown in FIG. 1 to provide articulated connection of the respective eccentric rod 15, 16 to the eccentric lever 14. FIG. 2 shows a cross section through the detail II of the connecting rod 10 in FIG. 1 and thus illustrates the prior-art articulated attachment of one of the eccentric rods 16 to the eccentric lever 14 by a connecting pin 16, which, as already explained, extends through apertures (not shown) in the eccentric lever 14 and an aperture 37 in the eccentric rod 16.

As can be seen from FIG. 2, the aperture 37 in the eccentric rod 16 and that section of the connecting pin 36 that extends through the aperture 37 each have cylindrical contours according to the prior art. To ensure proper functioning of the connecting rod, it is important to ensure that an axis of the respective eccentric rod 15, 16 and the respective connecting pin 36 are at right angles or that the axis of the respective connecting pin 36 and an axis of the eccentric of the eccentric adjusting device 13 are parallel. This cannot be achieved with the configuration of the connection of the respective eccentric rod 15, 16 to the eccentric lever 14, as shown in FIG. 2, and therefore deviations from this ideal geometrical relationship between the axis of the respective eccentric rod 15, 16 and the axis of the respective connecting pin 36 may arise. As a result, the bearing location or connection point between the respective eccentric rod 15, 16 and the eccentric lever 14 is subject to high wear. There is a requirement for a connecting rod and for an internal combustion engine having such a connecting rod that avoids the above disadvantages.

It is the object of the invention to provide a novel internal combustion engine and a novel connecting rod.

SUMMARY

According to the invention, the aperture in the respective eccentric rod through which the respective connecting pin extends and/or a section of the respective connecting pin that extends through the aperture in the respective eccentric rod have arched contours at least in some section or sections.

The invention allows articulated attachment of the respective eccentric rod to the eccentric lever of the eccentric adjusting device of the connecting rod in a manner that is insensitive to wear and insensitive to tolerances. The arched contouring, at least in some section or sections of the aperture in the respective eccentric rod and/or that section of the respective connecting pin that extends through the aperture in the respective eccentric rod compensates for tolerances in the manufacture of individual parts and during the assembly of the connecting rod.

The aperture in the respective eccentric rod, through which the respective connecting pin extends, and/or that section of the respective connecting pin that extends through the aperture in the respective eccentric rod is/are contoured so as to be arched spherically, or in a barrel shape, or convexly, at least in some section or sections. This arched contouring of the aperture in the respective eccentric rod and/or of that section of the respective connecting pin that extends through the aperture in the respective eccentric rod ensures articulated attachment of the respective eccentric rod to the eccentric lever of the connecting rod in a manner that is insensitive to wear and insensitive to tolerances.

Illustrative embodiments of the invention are explained in greater detail by means of the drawing without being restricted thereto.

DETAILED DESCRIPTION

Figure 1:
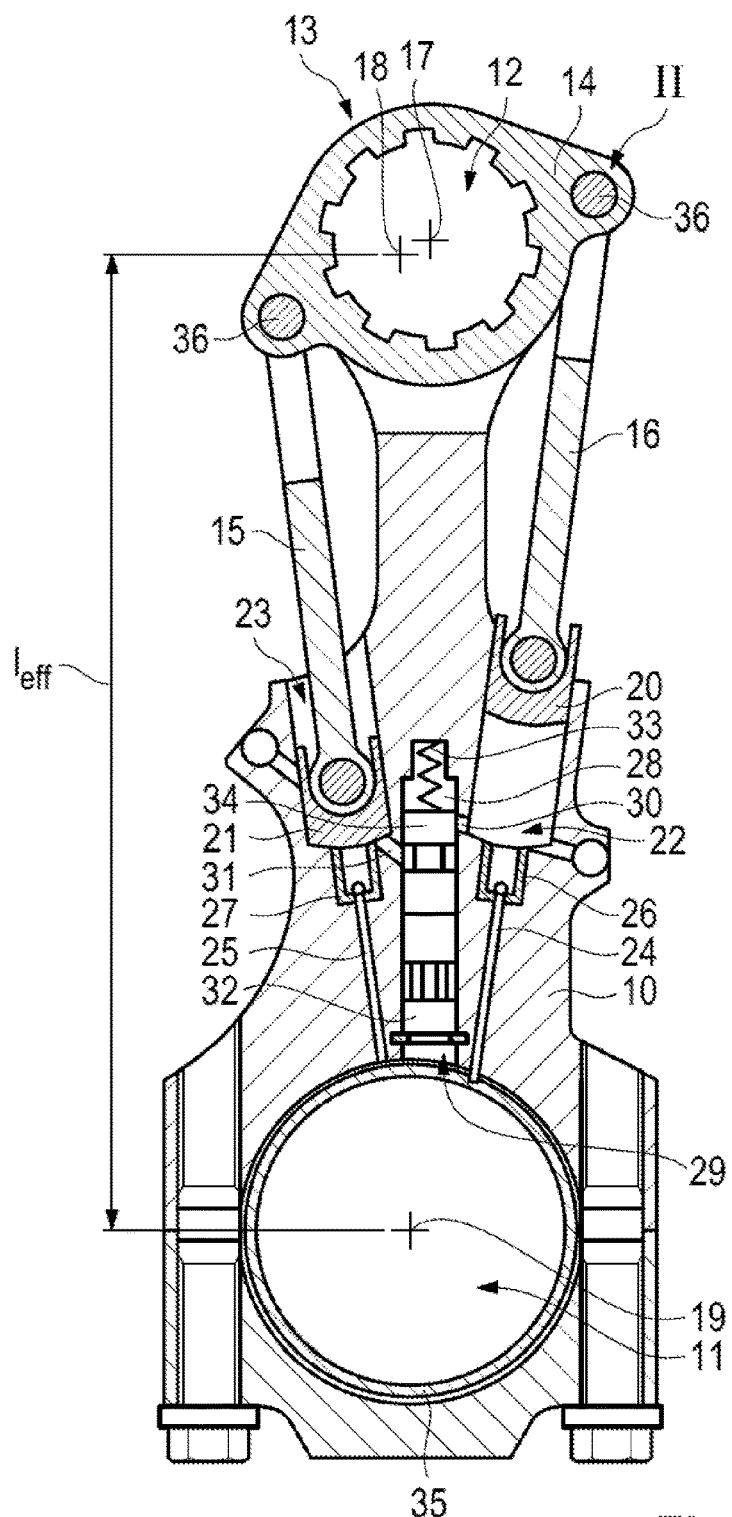
FIG. 1 shows a connecting rod of a prior-art internal combustion engine having an adjustable compression ratio.
Figure 2:
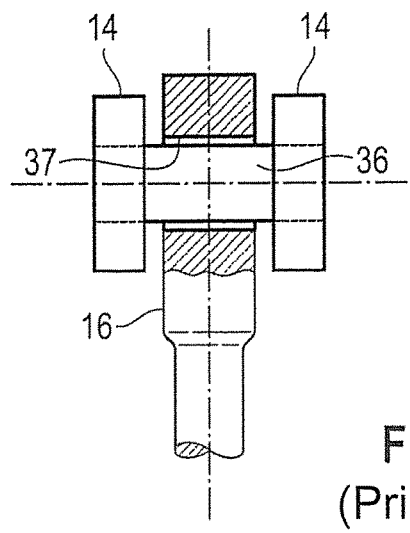
FIG. 2 shows a cross section through the detail II in FIG. 1.

An internal combustion engine having an adjustable compression ratio has at least one cylinder, preferably a plurality of cylinders. Each cylinder has a piston that is coupled to a crankshaft of the internal combustion engine by a connecting rod 10. Each connecting rod 10 has a small end bearing eye 12 at one end and a big end bearing eye 11 at an opposite end. The big end bearing eye 11 engages on a crankshaft bearing journal of the crankshaft in such a way that a connecting rod bearing shell is positioned between the crankshaft bearing journal and the big end bearing eye. A lubricating oil film can build up between the connecting rod bearing shell and the crankshaft bearing journal.

An internal combustion engine having an adjustable compression ratio has an eccentric adjusting device 13 in the region of each connecting rod 10 for adjusting the effective connecting rod length of the respective connecting rod 10.

The eccentric adjusting device 13 has an eccentric, an eccentric lever 14 and eccentric rods 15, 16, that can be moved in accordance with hydraulic pressure prevailing in hydraulic chambers interacting with the eccentric rods to adjust the compression ratio. The hydraulic chambers interacting with the eccentric rods 15, 16 can be supplied with hydraulic oil starting from the big end bearing eye 11 of the respective connecting rod.

Adjustment of the eccentric adjusting device 13 is initiated by the action of inertia forces and load forces of the internal combustion engine.

Figure 3A:
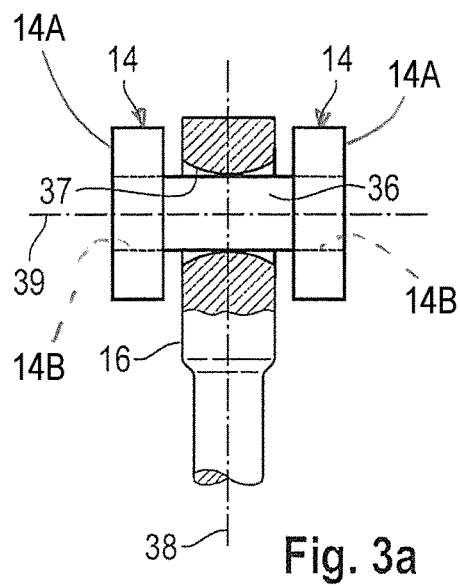
FIG. 3a shows a cross section through a detail of a first connecting rod according to the invention.
Figure 3B:
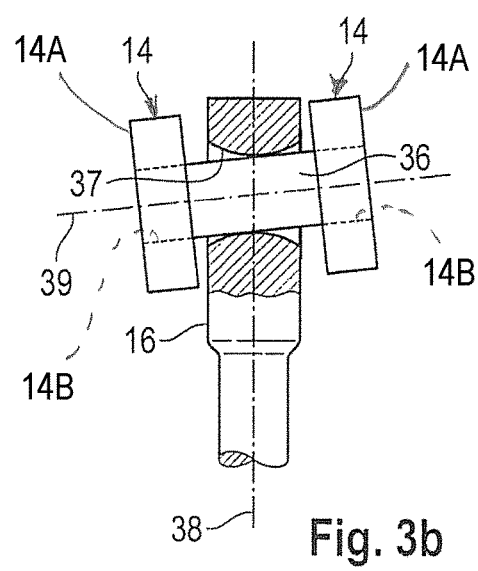
FIG. 3b shows the cross section of FIG. 3a with manufacturing tolerances.

The invention relates to optimum attachment of the eccentric rods 15, 16 of the eccentric adjusting device 13 to the eccentric lever 14. In this regard, each end of the eccentric lever 14 has two parallel bearing plates 14A formed respectively with registered apertures 14B as shown in FIGS. 3a and 3b. Connecting pins 36 are mounted in the registered apertures 14B and extend perpendicularly between the bearing plates 14A A first variant of the invention is shown in FIGS. 3a and 3b. According to FIGS. 3a and 3b, the aperture 37 in the eccentric rod 16 shown, through which the connecting pin 36 extends, has arched contours, at least in some section or sections, or, alternatively, continuously, namely is arched spherically or arched in a barrel shape or convexly arched. The section of the connecting pin 36 which extends through the registered apertures 37 has cylindrical contours in FIGS. 3a and 3b. Accordingly, the inside diameter of said aperture 37 decreases inward in the direction of the center of the aperture 37, starting from the ends or openings of the aperture 37 in the respective eccentric rod. FIG. 3a shows the ideal geometrical relationship between the connecting pin 36 and the eccentric rod 16 shown, wherein an axis 38 of the eccentric rod 16 shown ideally extends perpendicularly to an axis 39 of the connecting pin 36. FIG. 3b shows a configuration similar to FIG. 3a, but with possible tolerances illustrated in an exaggerated way. The axis 38 of the eccentric rod 16 shown no longer extends perpendicularly to the axis 39 of the connecting pin 36 shown. By means of the configuration of the aperture 37 with arched contours, at least in some section or sections, relative movement is possible between the connecting pin 36 and the eccentric rod 16, namely a tilting movement of the connecting pin 36 about the contour of the aperture 37, which is arched at least in some section or sections. As a result, the axis 39 of the connecting pin 36 can then align itself with the axis 38 of the eccentric rod 16 in order to ensure attachment of the respective eccentric rod 16 to the eccentric lever 14 in a manner which is insensitive to wear and insensitive to tolerances.

Figure 4:
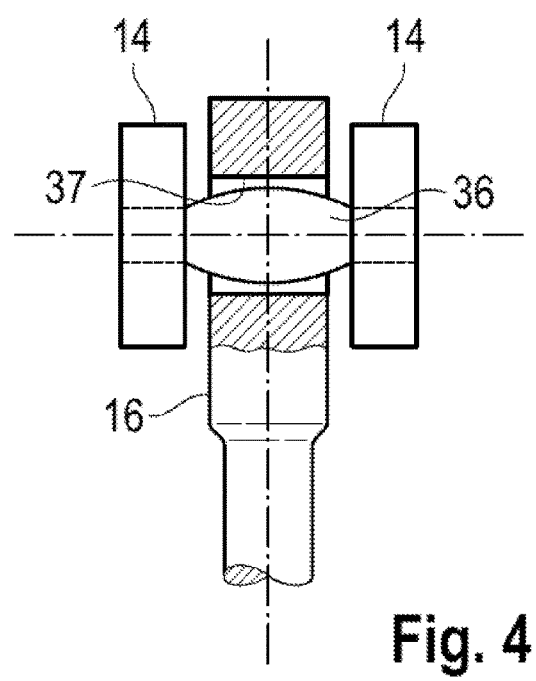
FIG. 4 is a cross section through a detail of an alternate embodiment.

A second variant of the invention is shown by FIG. 4, wherein it is not the aperture 37 in the eccentric rod 16 which has arched contours in the variant in FIG. 4 but, on the contrary, that section of the connecting pin 36 which extends through the aperture 37. This connecting pin 36 preferably is contoured in a spherically arched manner, in a barrel shape, or contoured so as to be convexly arched, at least in some section or sections so that the outside diameter of the section of the connecting pin 36 increases in the inward direction, when viewed from the outside. In FIG. 4, the aperture 37 has cylindrical contours.

According to another embodiment (not shown) of the invention, it is possible that both the aperture 37 of the respective eccentric rod 15, 16 and that section of the respective connecting pin 36 which extends through the aperture 37 are contoured so as to be arched, at least in some section or sections, or, alternatively, so as to be arched continuously, preferably so as to be arched spherically or arched in a barrel shape or convexly arched.

The invention ensures optimum articulated attachment of the eccentric rods 15, 16 of the eccentric adjusting device 13 of the connecting rod 10 to the eccentric lever 14. The attachment of the eccentric rods 15, 16 to the eccentric lever 14 is insensitive to wear and insensitive to tolerances. Manufacturing tolerances and assembly tolerances can be compensated.

What is claimed is:

1. A connecting rod, comprising a big end bearing eye for attachment to a crankshaft, a small end bearing eye for attachment to a piston of a cylinder, and an eccentric adjusting device for adjusting an effective connecting rod length, the eccentric adjusting device having an eccentric lever that is mounted at the small end bearing eye, the eccentric lever having first and second pairs of parallel bearing plates disposed so that the small end bearing eye is between the first pair of bearing plates and the second pair of bearing plates, the bearing plates in each of the pairs being spaced from one another and having registered apertures extending therethrough, first and second eccentric rods formed respectively with ends disposed between the bearing plates of the respective first and second pairs of bearing plates, the ends of the eccentric rods having apertures extending therethrough and substantially aligned with the registered apertures in the respective first and second pairs of bearing plates, connecting pin aligned perpendicular to the bearing plates and extending through the respective registered apertures in the eccentric lever and through the aperture in the end of the respective eccentric rod, the aperture in the respective eccentric rod, through which the respective connecting pin extends has opposed axial ends and a convexly arched contour extending continuously between the opposed axial ends of the respective aperture and further extending uniformly around a periphery of the respective aperture in the eccentric rod to accommodate non-perpendicular alignment of eccentric rods to axes of the registered apertures in the bearing plates.

2. The connecting rod of claim 1, wherein the aperture in the respective eccentric rod, through which the respective connecting pin extends is contoured to be arched spherically or in a barrel shape.

3. The connecting rod of claim 1, wherein the aperture in the respective eccentric rod has cylindrical contours, and sections of the respective connecting pin that extend through the aperture in the respective eccentric rod has arched contours, at least in some section or sections.

4. The connecting rod of claim 1, wherein that section of the respective connecting pin that extends through the aperture in the respective eccentric rod has cylindrical contours.

5. The connecting rod of claim 1, wherein the aperture in the respective eccentric rod and that section of the respective connecting pin that extends through the aperture in the respective eccentric rod both have arched contours, at least in some section or sections.

6. An internal combustion engine that has an adjustable compression ratio comprising at least one cylinder and a crankshaft on which the connecting rod of claim 1 engages.

\* \* \* \* \*